United States Patent [19]

Mallah et al.

[11] Patent Number: 5,847,376

[45] Date of Patent: Dec. 8, 1998

[54] PROCESS AND PLANT FOR THE MANUFACTURE OF SOLID CASTINGS FROM AN ESSENTIALLY LIQUID REACTIVE MEDIUM, AND OVEN FOR HEATING AN ESSENTIALLY LIQUID MEDIUM

[75] Inventors: Mohamad Mallah, Amberg; Horst Linn, Eschenfelden, both of Germany; Niklaus Saner, Hersberg; Peter Voirol, Oberwill, both of Switzerland

[73] Assignee: Ciba Specialty Chemicals Corporation, Tarrytown, N.Y.

[21] Appl. No.: 840,561

[22] Filed: Apr. 15, 1997

Related U.S. Application Data

[62] Division of Ser. No. 545,746, Jan. 30, 1996, Pat. No. 5,703,343.

[30] Foreign Application Priority Data

May 5, 1993 [EP] European Pat. Off. .............. 93810331
Jan. 12, 1994 [CH] Switzerland ................................ 89/94

[51] Int. Cl.$^6$ ..................................................... H05B 6/80
[52] U.S. Cl. ........................... 219/687; 219/628; 219/655
[58] Field of Search ..................................... 219/628, 629, 219/630, 631, 643, 655, 656, 657, 687, 688, 689, 690, 691, 693, 695, 698

[56] References Cited

U.S. PATENT DOCUMENTS

| 28,498 | 7/1860 | Moore | 264/327 |
|---|---|---|---|
| 3,372,214 | 3/1968 | Marcey | 264/25 |
| 3,535,482 | 10/1970 | Kluck | 219/10.55 |
| 3,553,413 | 1/1971 | Sonlier | 219/695 |
| 3,777,000 | 12/1973 | Kusenberg et al. | 264/327 |
| 4,221,948 | 9/1980 | Jean | 219/695 |
| 4,269,581 | 5/1981 | Vry et al. | 425/174.4 |
| 4,671,757 | 6/1987 | Volk, Jr. | 425/144 |
| 4,775,770 | 10/1988 | Fritz | 219/10.55 |
| 4,866,233 | 9/1989 | Fritz | 219/695 |
| 4,952,763 | 8/1990 | Fritz | 219/10.55 |
| 5,703,343 | 12/1997 | Mallah et al. | 219/687 |

FOREIGN PATENT DOCUMENTS

| 0136453 | 7/1984 | European Pat. Off. . |
| 0252542 | 1/1988 | European Pat. Off. . |
| 2614490 | 10/1988 | France . |
| 2617754 | 1/1989 | France . |
| 2028873 | 12/1970 | Germany . |
| 72629 | 12/1974 | Poland . |
| 9003840 | 4/1990 | WIPO . |

*Primary Examiner*—Tu Ba Hoang
*Attorney, Agent, or Firm*—David R. Crichton

[57] ABSTRACT

The present invention relates to an oven for heating an essentially liquid medium, especially a reactive casting material, flowing through the oven. The oven has an inlet into a channel for the medium to be heated, in which channel there is arranged a separate pipe through which the medium to be heated flows and in which it is heated by electromagnetic radiation. Several heating units are arranged along the channel, each of which comprises an electromagnetic radiator containing a waveguide. The waveguides guide the radiation to the channel through which the medium flows and which couples the radiation into that channel. The heating units are substantially decoupled from one another by means of a decoupling diaphragm that is provided in the channel and is arranged between two adjacent heating units or radiators essentially at right angles to the direction of flow. The pipe through which the medium flows passes through a passage in the decoupling diaphragm, thus also constituting a support for the pipe.

33 Claims, 8 Drawing Sheets

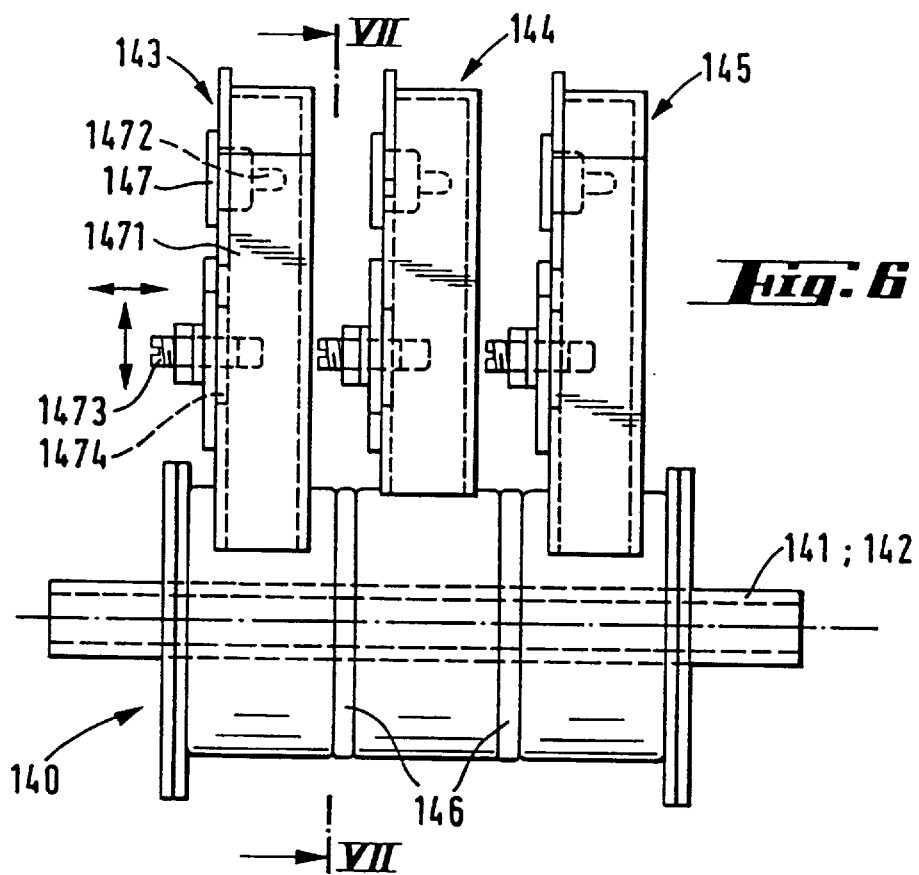
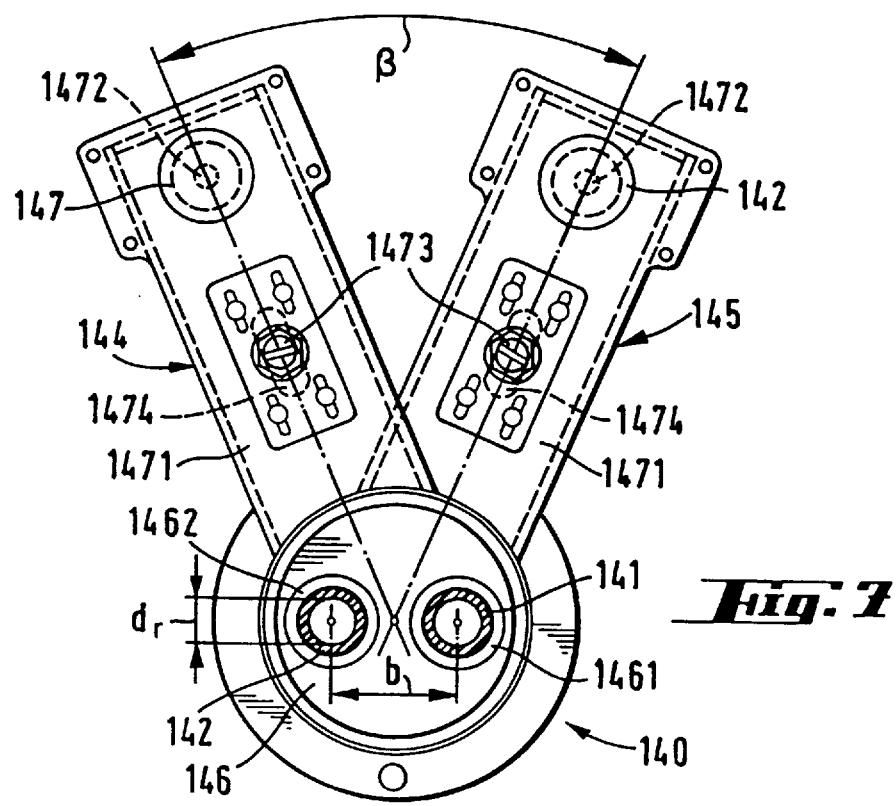

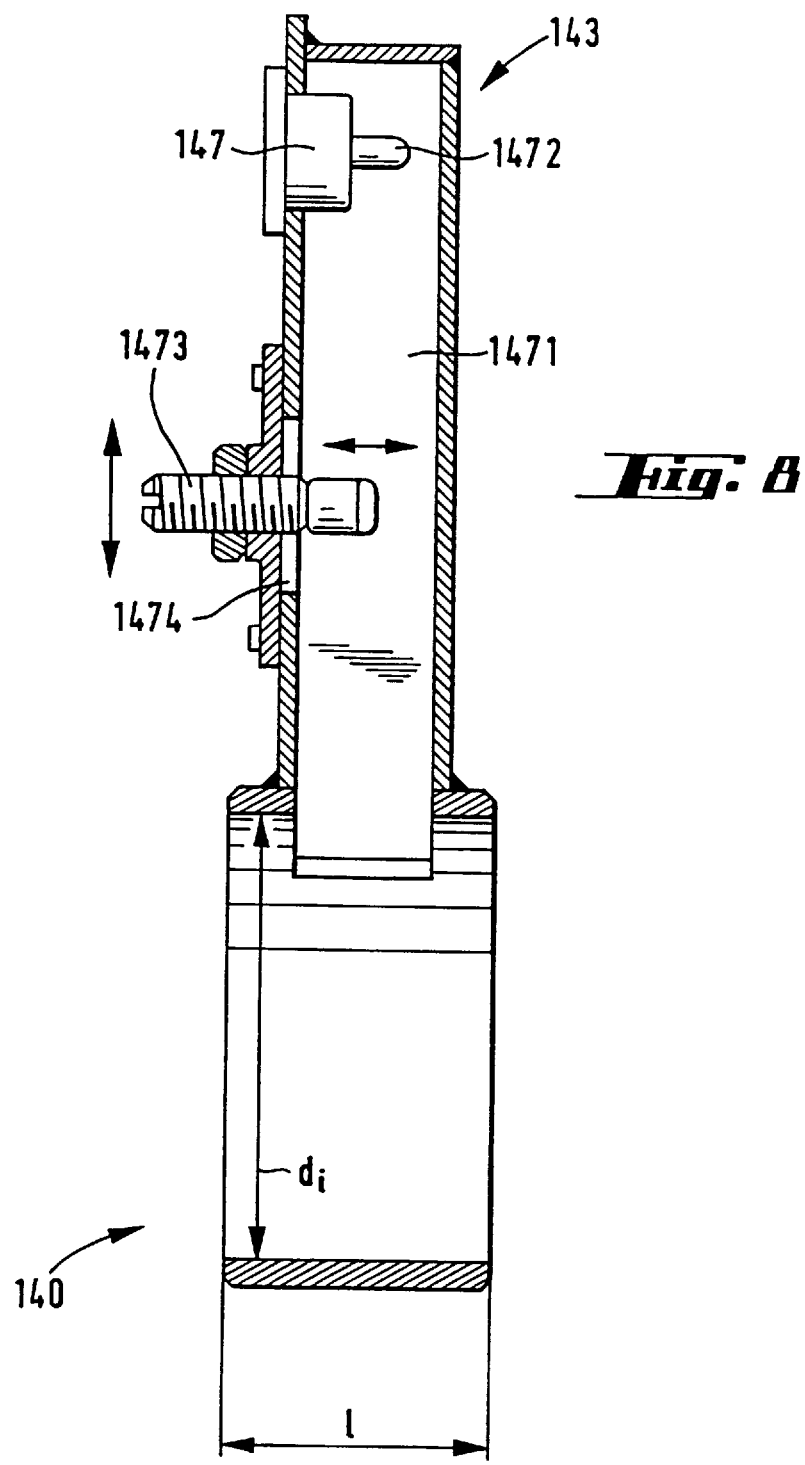

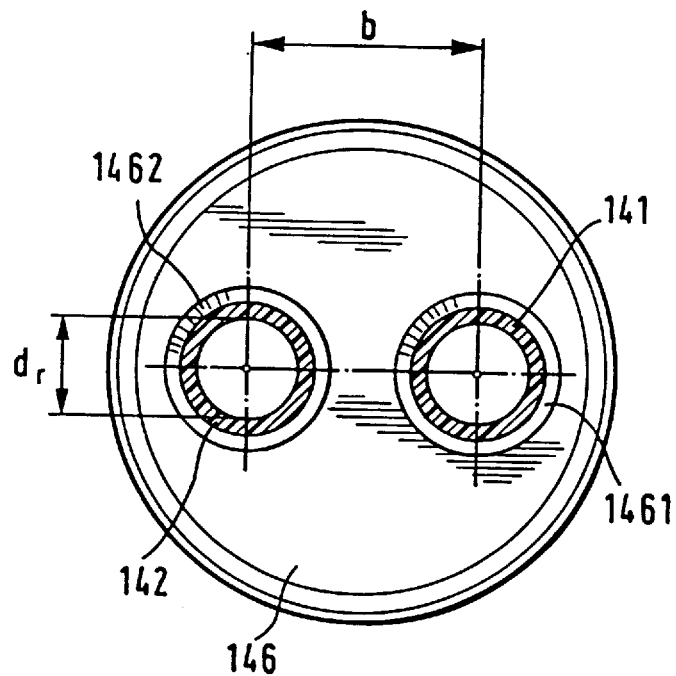
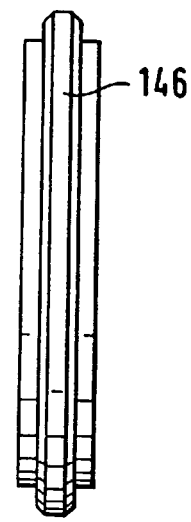
Fig. 9   Fig. 10
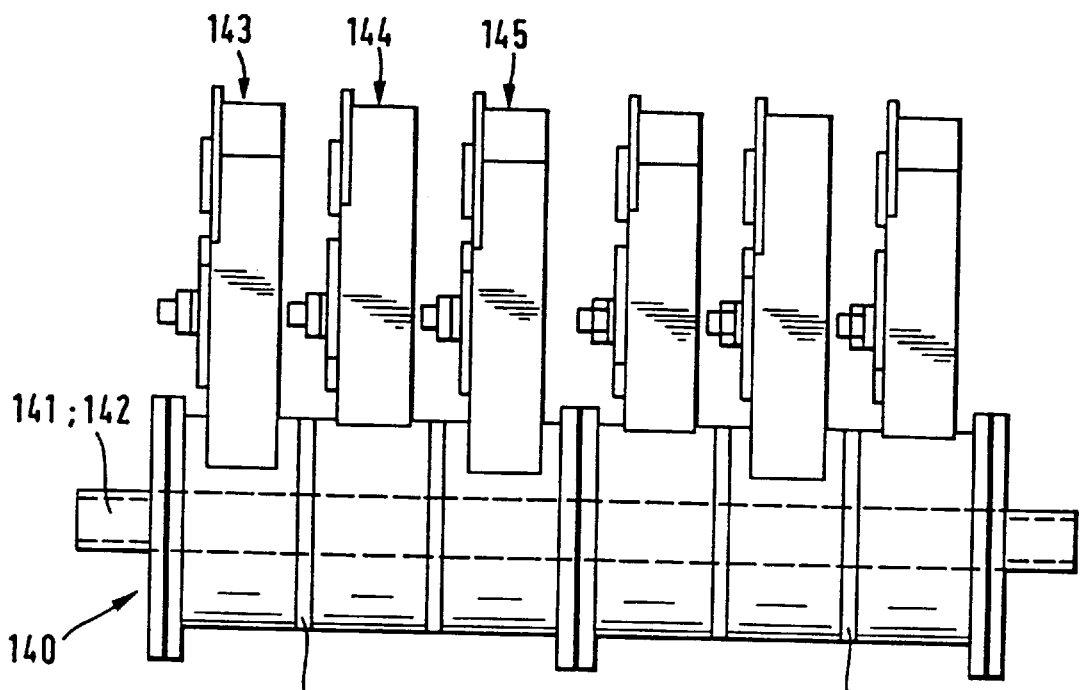
Fig. 11

PROCESS AND PLANT FOR THE MANUFACTURE OF SOLID CASTINGS FROM AN ESSENTIALLY LIQUID REACTIVE MEDIUM, AND OVEN FOR HEATING AN ESSENTIALLY LIQUID MEDIUM

This is a division of prior 371 application of PCT/EP94/01275, as amended under PCT Article 34 on Jan. 26, 1995 and Mar. 31, 1995 and assigned Ser. No. 08/545,746, now U.S. Pat. No. 5,703,343, and having a 35 U.S.C. 371 date of Jan. 30, 1996.

The invention relates to a process and a plant for the manufacture of solid castings from an essentially liquid reactive medium and to an oven for heating an essentially liquid medium in accordance with the respective independent patent claim.

BACKGROUND OF THE INVENTION

The manufacture of solid castings is today being used for a very wide variety of purposes. In particular, castings of the kind that include as a part of the casting a component or some other body that has been cast inside the casting are also being produced. One area in which such a procedure is very common is the electrical engineering components field in which components or bodies are encapsulated, for example for the purpose of protection against environmental effects or for insulation.

Such processes for the manufacture of solid castings from reactive liquid media as the casting material are known, for example, from DE-A-20 28 873. In the process described therein, the casting material used is a highly reactive epoxy resin material which is distinguished especially by the fact that, when its gelation temperature is exceeded, a reaction takes place in which thermal energy is released, and the thermal energy released during the reaction ensures that the reaction, once triggered, then proceeds, as it were, by itself, and the casting material becomes solid. To produce the casting, the casting material is introduced into a casting mould of which the inner wall has been heated to a temperature that lies above the gelation temperature of the casting material. The casting material is introduced into the mould from the base. In that operation, the casting material is supplied at a temperature which lies distinctly below the gelation temperature so that the reaction does not under any circumstances commence before the casting material has been introduced into the mould.

Although the above process has proved very successful, certain improvements are still possible. For example, the duration of a cycle, that is to say the period for which the mould is occupied in order to produce a single casting, is comparatively long, since the temperature of the casting material lies distinctly below the gelation temperature when it is introduced into the mould and the casting material has to be heated at least to the gelation temperature, at which the reaction then commences. There is consequently still room for improvement as regards employing the moulds to capacity. On the other hand, however, care must also be taken that the castings do not contain any bubbles or cracks. Cracks may occur in the casting especially if either the reactivity of the casting material is markedly increased, so that the energy peak during the reaction of the epoxy resin becomes too high, or if the inner wall of the mould is heated to a temperature too far above the gelation temperature of the epoxy resin. As a consequence the thermal stresses in the casting may be too high, which may result in the formation of cracks.

An aim of the invention is therefore to reduce the duration of a cycle, that is to say the period for which the mould is occupied to produce a single casting, and at the same time to manufacture castings that are free from bubbles and cracks.

SUMMARY OF THE INVENTION

That aim is achieved in accordance with the process by substantially preheating the casting material to a temperature close to but below its gelation temperature directly before it enters the casting mould of which the inner wall has been heated to a temperature above the gelation temperature of the casting material. That measure, that is to say substantially heating the casting material to a temperature close to but below its gelation temperature directly before it enters the mould, prevents the reaction of the casting material from commencing before the material has been fed into the mould, so that it is still in a state suitable to be fed into the casting mould. Heating of the casting material in the mould therefore does not have to commence at the otherwise customary lower temperature. As a result, the time taken for the casting material to be heated to the gelation temperature in the mould and for the reaction of the casting material to commence is considerably reduced. The duration of a cycle is consequently shortened considerably. At the same time it is possible to produce in that manner castings that are free from bubbles and cracks.

In one example embodiment of the process according to the invention, the casting material used is a mixture of hexahydrophthalic acid diglycidyl ester, hexahydrophthalic acid anhydride, benzyldimethylamine and a silanised quartz powder, in a ratio of approximately 100 parts by weight of hexahydrophthalic acid diglycidyl ester: approximately 90 parts by weight of hexahydrophthalic acid anhydride: approximately 0.5 parts by weight of benzyldimethylamine: approximately 285 parts by weight of silanised quartz powder. The temperature of the casting material in the supply tank is in that case approximately from 30° C. to 60° C., preferably approximately from 40° C. to 50° C. During the preheating operation directly before introduction into the mould, the casting material is heated to a temperature of approximately from 90° C. to 110° C., preferably approximately from 95° C. to 100° C. The preheated casting material is then fed to the casting mould, which has a temperature of approximately from 130° C. to 150° C., preferably approximately from 140° C. to 145° C. Using that casting material and those temperatures it is possible to produce castings of especially good quality.

The plant proposed in accordance with the invention in order to achieve the aim comprises a supply tank for providing the essentially liquid reactive medium. In that supply tank the temperature of the medium, that is of the casting material, is below the gelation temperature. The plant also comprises a feeding means for feeding the medium into a casting mould. The casting mould is heated to a temperature that lies above the gelation temperature of the casting material. Connected directly upstream of the casting mould is an oven through which the casting material flows and is thereby preheated. It is therefore not necessary for the casting material to be heated in the mould starting from the otherwise customary lower temperature. As a result, the time taken for the casting material to be heated to the gelation temperature in the mould and for the reaction of the casting material to commence is considerably reduced. On the other hand, the measure of connecting the oven directly upstream of the casting mould and thus substantially heating the casting material shortly before it enters the mould prevents the reaction of the casting material from commencing before the casting material has been fed into the mould. It is thus possible for the duration of a cycle, that is to say the period for which the mould is occupied in order to produce a single casting, to be shortened considerably. At the same time it is possible to produce in that manner castings that are free from bubbles and cracks, that is to say that suffer no loss in quality.

In one example embodiment of the plant according to the invention, there is in addition connected between the supply tank and the oven a separate pressure vessel from which the casting material is taken and fed through the oven into the casting mould. Such a pressure vessel is advantageous especially in view of the fact that the casting material can be stored therein, as it were, ready for the casting operation. Depending on the nature of the casting material used (for example in the case of epoxy resins), the material is first of all subjected to a degassing operation by being stirred in a large supply tank fitted with a stirrer before it is ready for the casting operation.

In a further development of the example embodiment just described, the pressure vessel is arranged on a set of scales. The weight of the filled pressure vessel is ascertained by weighing and the scales are then, for example, reset to zero before the mould is filled. Resetting of the scales to zero is not, however, essential. When an amount which is to be introduced into the mould is taken from the pressure vessel, then when the desired amount of casting material has been taken from the pressure vessel the scales send a signal to a control means. The pressure under which the casting material is conveyed to the casting mould is then increased.

The plant according to the invention is an important field of use for the oven according to the invention which is connected directly upstream of the casting mould. A great variety of ovens for heating various materials are known from the prior art, for example from EP-A-0,252,542, from FR-A-2,614,490, from U.S. Pat. No. 3,535,482 and also from EP-A-0,136,453.

U.S. Pat. No. 3,535,482 deals with an apparatus for the rapid heating of fluids, in which a microwave heat exchanger is used for heating the fluids. EP-A-0,136,453 deals with a microwave oven for heating objects. This oven has two microwave radiators generating electromagnetic fields which superimpose such, that the maximum of the superimposed electromagnetic fields is located in the object. EP-A-0,252,542 and FR-A-2,614,490 both disclose a microwave oven having magnetrons arranged along the channel through which the material to be heated flows. The microwaves generated by the magnetrons are guided to the channel by means of waveguides and are coupled into that channel where they are absorbed by the material to be heated.

The oven according to the instant invention is so designed that the medium to be heated, especially a reactive casting material, passes through an inlet into a pipe arranged in a channel. The medium flows through the oven in that pipe. As it flows through the pipe the medium is heated by means of electromagnetic radiation, which is effected by means of several separate heating units arranged along the channel. Each heating unit comprises an electromagnetic radiator having a waveguide that guides the electromagnetic radiation to the channel through which the medium to be heated flows and that couples the radiation into that channel. The heating units are substantially decoupled from one another by means of a decoupling diaphragm, which is provided in the channel and which is arranged between two adjacent heating units or radiators essentially at right angles to the direction of flow. Decoupling of the individual radiators from one another ensures that they have a better working area and thus ensures that the medium flowing through is heated well. The pipe through which the mediums flows is passed through a passage in the decoupling diaphragm the diaphragm thus also constituting a support for the pipe.

In an advantageous example embodiment of the oven, the waveguides of the individual radiators are so arranged along the channel that they couple the radiation into the channel transversely to the direction of flow of the medium to be heated.

An oven radiator may be so designed as to comprise a high frequency generator (HF generator) and, connected thereto, a waveguide which opens into the channel. That waveguide guides the radiation generated by the HF generator to the channel and couples it into that channel. The cross-section of the waveguide is preferably rectangular, which is important from the point of view of the excitation of the modes necessary for the proposed heating process and capable of propagation which provide a uniformly good heating of the medium flowing through the channel.

As has been mentioned above, there is arranged in the channel, the geometric shape and dimensions of which can be determined with a view to the necessary minimisation of the space requirement and taking into consideration the casting material that is to be heated, a separate pipe through which the medium to be heated flows. Minimisation of the space requirement renders possible any desired integration in other machines or plants or parts of machines or plants. The pipe is passed through a passage in the decoupling diaphragm and preferably consists of a material of which the dielectric losses are negligible in the operative wavelength range. As already mentioned above, the decoupling diaphragm in that arrangement acts in addition as a support for the pipe.

The diaphragm may be designed to lead in the form of a funnel towards its passage for the pipe, the generatrix of the funnel in the longitudinal direction viewed in the plane of longitudinal section complying with an exponential function having a negative exponent. The exponential function with which the generatrix of the funnel of the diaphragm in the longitudinal direction complies may be described especially by $$a(z)=a_1 \times \exp-(3.13 \times 10^{-4} \times k \times z \times (1-f_c/f)^2)$$

is wherein z denotes the coordinate on the longitudinal axis of the channel, a(z) denotes the distance of the respective point of the generatrix of the funnel from the longitudinal axis of the channel, $a_1$ denotes the distance from the longitudinal axis of the channel at the beginning of the funnel, i.e. when z=0, k denotes the wave number, $\phi$ is the attenuation in dB of the return component of the wave compared with the forward component, $f_c$ denotes the minimum possible frequency, that is the lower limiting frequency, and f denotes the actual frequency of the wave. With such diaphragms it is possible, even in the case of small diaphragm lengths in the direction of the longitudinal axis, nevertheless to achieve a good attenuation effect (diaphragm length in the direction of the longitudinal axis $\leq 20$ mm).

Preferably, there is always a decoupling diaphragm arranged between two adjacent heating units so that decoupling of the individual units, especially the generators of those units, is ensured and thus stable operation of the generators is assured.

As has already been mentioned, the radiators may comprise an HF generator with a waveguide connected thereto as radiation guide, which guides the radiation generated by the HF generator to the channel and couples it into the latter. Adjacent radiators should preferably be decoupled from one another in that arrangement. For that purpose the radiators may be so arranged along the channel that the coupling of the high-frequency radiation into the channel occurs with a different direction of polarisation in each case. That can be achieved, for example, by offsetting adjacent radiators by a certain angle with respect to one another, preferably by an angle of approximately 90°, and/or by using suitable polarisation filters between the individual radiators. In addition, the offsetting, preferably by an angle of approximately 90°, reduces locally unfavourable superposition of the field components of the electromagnetic field produced, as a result of which a more homogeneous temperature distribution can be achieved in the area of space in which the high-frequency radiation is acting.

It is possible to arrange the HF generators directly, that is to say without waveguides, along the channel. So that there is no interference between the HF generators, decoupling of the HF generators is possible, for example by offsetting them with respect to one another and/or by using polarisation filters between them.

A further aspect of the oven according to the invention relates to the possibility of repeatedly passing the medium to be heated through the oven and exposing it to the heating electromagnetic radiation. By that means better use is made of the interior of the oven, especially the channel, and also of the radiation fed into the channel.

There are especially provided in the channel a forward pipe and a return pipe, the medium to be heated flowing first through the forward pipe and then through the return pipe. The longitudinal axes of the two pipes are arranged at a distance from the longitudinal axis of the channel that is so selected that the electrical field component of the radiation has a maximum on the longitudinal axis of the two pipes. In that manner the radiation coupled into the channel is used twice. That also simplifies the control and regulation of the output of the magnetrons. If, for example, the temperature of the resin at the outlet of the return pipe is measured and it is established that it is too high or too low, then the output of the magnetrons has to be regulated by a smaller amount than would be necessary if it were to be used only once, thus rendering possible more rapid regulation of the output. In addition, the homogeneity of the temperature distribution in the casting material is thereby increased.

A further aspect of the invention relates to the possibility of the oven being of modular design with each individual module comprising an electromagnetic radiator having a waveguide which opens into a channel portion bounded at each end by closing walls, thus defining a resonance chamber. The electromagnetic radiation is coupled into that chamber. By means of passages through the closing walls there is guided through the resonance chamber at least one separate pipe through which the medium to be heated flows. That is of advantage especially if relatively large amounts of a casting material have to be heated within a short period, and consequently more energy in the form of microwave radiation has to be supplied since also a larger amount of casting material has to be heated. The modular construction is very advantageous since the individual modules are simple to assemble and consequently it is possible for ovens of even greater output also to be constructed using the same modules simply by connecting several individual modules one after another.

The channel portion of such a module is, for example, in the form of a hollow cylinder and has an internal diameter selected to be approximately $n \times \lambda_g/1.236$, n being a natural number and $\lambda_g$ the wavelength of the radiation in the waveguide. Furthermore, the length of the channel portion is smaller than half the wavelength and is approximately in the region of half the internal diameter of the channel portion, it being possible for that length to vary by a constant that depends on the frequency of the radiation and on the medium flowing through the pipe. That constant A is inversely proportional to the frequency employed and to the dielectric constant of the casting material. The length of the channel portion is so selected that the electrical field component of the radiation has a minimum at the passage through the closing wall. In principle it is then possible to do without separate decoupling measures, but even so the closing walls naturally have to be provided between the individual units in order to define the resonance chamber for the wave propagating therein. The closing wall does not, however, have to have a funnel with an exponential curve.

The distance between the longitudinal axes of the forward and return pipes may in particular be approximately half the internal diameter of the channel portion for pipe diameters that range from a quarter of the internal diameter of the channel portion to half the internal diameter of the channel portion. The distance between the longitudinal axes of the forward and return pipes for pipe diameters that are in the region of less than a quarter of the internal diameter of the channel may be approximately half the internal diameter of the channel plus an amount obtained by multiplying a factor with the pipe diameter, that factor ranging from 0.5 to 1.2

A further aspect of the oven according to the invention relates to the possibility of conveying the medium to be heated along a helical line through the oven. As a result, a longer interaction between the casting material and the electromagnetic field can be achieved, that measure serving to achieve a higher efficiency of the oven since the path along which the casting material is transported in the oven is longer.

According to a further aspect of the invention, there is provided in each waveguide a displaceable tuning screw which can be so displaced that it represents an open circuit for the wave going towards the channel and a short circuit for the wave returning from the channel. The tuning screw is displaceable in a slot so that when there are different high-frequency ratios in the transition plane between the waveguide and the channel it is possible to effect optimal adaptation of the output. It can also be displaced in the direction into and out of the waveguide and can consequently always be optimally adjusted for different frequencies.

In the following, the invention is explained in detail with reference to the drawings, in which at least partly in section or in diagrammatic form:

BRIEF DESCRIPTION OF THE DRAWINGS

FIG. 6 is a further example embodiment of an oven according to the invention, FIG. 7 is a section along the line VII—VII of FIG. 6, FIG. 8 shows a heating unit of the example embodiment of the oven according to FIG. 6, FIG. 9 is a side view of a closing wall of the heating unit, FIG. 10 is a further side view of the closing wall of FIG. 9 and FIG. 11 is a variant of the oven according to the invention which comprises two modules each having three heating units.

DETAILED DESCRIPTION OF THE INVENTION

Figure 1:
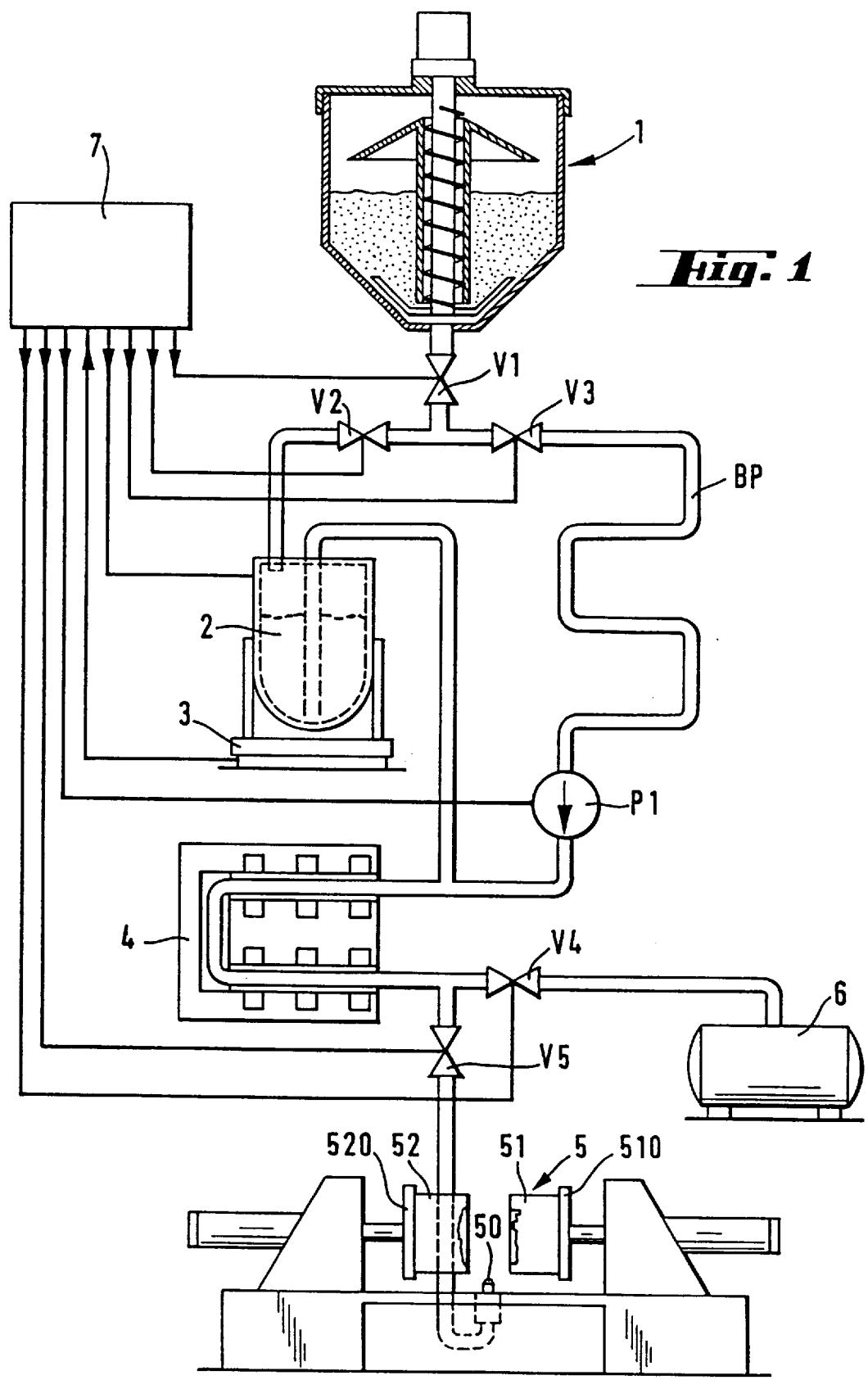
FIG. 1 shows a general plan of an example embodiment of a plant according to the invention.

In the example embodiment of the plant according to the invention shown in FIG. 1, there is a supply tank in the form of a degassing mixer 1 in which the casting material is degassed by stirring. The outlet of the degassing mixer 1 can be closed by means of a valve V1. Degassed casting material can be fed into a pressure vessel 2 through a supply line which can be closed by a valve V2. If the casting material from the degassing mixer 1 is not to go into the pressure vessel 2, for example if the pressure vessel 2 is being repaired, a by-pass line BP which can be closed by means of a valve V3 is provided through which the casting material can flow out of the degassing mixer 1. Normally, however, when the casting material is removed from the degassing mixer 1 it is fed into the pressure vessel 2.

The pressure vessel 2 is arranged on scales 3. Casting material can be removed from the pressure vessel 2 by means of the pressure. In a case where the casting material flows through the by-pass line BP, the pump P1 takes over the function of the pressure in the branch in which the pressure vessel is arranged. The casting material taken from the pressure vessel 2 (or the casting material conveyed by the pump P1) flows through a microwave oven 4 and then passes through a supply line, which can be closed by means of a valve V5, into the casting mould 5 of which the inner wall has been heated to a temperature that lies above the gelation temperature of the casting material. The casting material is fed into the mold from the base, as described in DE-A-20 2 873 already mentioned at the beginning. The casting is moulded and produced in the casting mould 5.

The example embodiment of the plant according to the invention shown in FIG. 1 furthermore comprises, in addition, a drain valve V4, which connects a discharge line to a collecting vessel 6 and is closable. All the valves V1, V2, V3, V4 and V5, the pressure vessel 2, the pump P1 and the scales 3 are connected to a control means 7, the mode of operation of which is explained in the following in connection with the description of the operation of the plant.

When the plant is started, at first only the degassing mixer 1 is full of the casting material, e.g. the mixture mentioned hereinbefore. The temperature of the casting material in the supply tank is approximately from 30° C. to 60° C., preferably approximately from 40° C. to 50° C., and is thus distinctly below the gelation temperature of the mixture, which is unreactive at that temperature. After the casting material (mixture) has been degassed, the control means 7 opens the valves V1 and V2, valve V3 remaining closed The casting material coming from the degassing mixer 1 thus passes into the pressure vessel 2 and the latter is filled. Once the pressure vessel 2 is full, valves V1 and V2 are closed again. The casting material is now located in the pressure vessel 2 ready for the casting operation.

The control means 7 then first of all opens the valve V4 and casting material is conveyed until the air has been removed from the lines and the oven 4, that is to say until the casting material has reached the collecting vessel 6. The valve V4 is then closed again and valve V5 is opened until the casting material has flowed out of the casting head. The valve V5 is then also closed again and the plant is then completely free of air and is thus ready to be used for the casting operation.

The scales 3 are reset to zero, and the mould halves 51 and 52 with the heating plates 510 and 520 are closed. Valve V5 is then opened so that the casting material can be fed into the casting mould 5. The temperature of the casting mould 5 is approximately from 130° C. to 150° C., preferably approximately from 140° C. to 145° C., that is to say above the gelation temperature of the casting material. The scales, which monitor the weight of the pressure vessel 2 with the casting material contained therein, send a signal to the control means 7 when a particular adjustable amount of casting material has been taken from the pressure vessel 2, and the control means 7 increases the pressure under which casting material is supplied to the casting mould 5. The adjustable amount of casting material depends in each case on the casting material used and on the geometry of the casting to be produced. The amount of casting material which passes into the casting mould 5 at elevated pressure is only that amount which is necessary to compensate for the shrinkage in volume during the reaction of the mixture in the casting mould 5 in order to produce a bubble-free casting. The elevated pressure is, however, maintained. Once the volume shrinkage of the casting material in the mould has been compensated, then in spite of the fact that pressure is still being applied no more casting material passes through the microwave oven 4 into the casting mould.

When the casting has been moulded and produced to the extent that it can be removed from the casting mould 5, the valve V5 is closed and the mould halves 51 and 52 are opened again. The mould is then cleaned, the mould halves 51 and 52 are closed again and the valve V5 is opened again so that a new casting can be produced in the same manner.

In the interval between the manufacture of two castings, the lines commencing at the pressure vessel 2 and passing through the microwave oven 4 to the casting head 50 remain filled with casting material. If that interval exceeds a particular duration, the control means 7 opens the valve V4 so that the reactive casting material located in the lines can pass into the collecting vessel 6, since otherwise reaction of the casting material might occur and the solidified casting material might block the lines, especially in the microwave oven 4, as a result of which the operation of the entire plant would then have to be interrupted.

In the microwave oven 4, which has already been mentioned several times and which is connected directly upstream of the casting mould 5, the casting material is heated by means of electromagnetic radiation (by means of microwave radiation) to a temperature just below its gelation temperature, that is to say, for example, to a temperature of approximately from 90° C. to 110° C., preferably to approximately from 95° C. to 100° C., for the mixture mentioned above, before it is conveyed to the casting mould 5. With the plant according to the invention, therefore, the casting material fed into the casting mould does not have to be heated starting from the otherwise customary lower temperature of approximately from 40° C. to 50° C. As a result, the time taken for the casting material to be heated to the gelation temperature in the mould and for the reaction of the casting material to commence is considerably reduced. On the other hand, the measure of connecting the microwave oven directly upstream of the casting mould and thus substantially heating the casting material before it enters the mould prevents the reaction of the casting material from commencing before the casting material has been fed into the mould. It is thus possible for the duration of a cycle, that is to say the period for which the mould is occupied in order to produce a single casting, to be shortened considerably. At the same time it is possible to produce in that manner castings that are free from bubbles and cracks, that is to say that suffer no loss in quality.

The plant according to the invention is a very important field of application for the microwave oven 4 according to the invention which is connected directly upstream of the casting mould 5. An example embodiment of that microwave oven 4 is explained in detail in the following with reference to FIG. 2. Whereas in FIG. 1 the channel through which the casting material flows in the oven is essentially U-shaped so as to minimise the space requirement, another example embodiment of the oven in which the channel is of a straight design will be explained with reference to FIG. 2.

Figure 2:
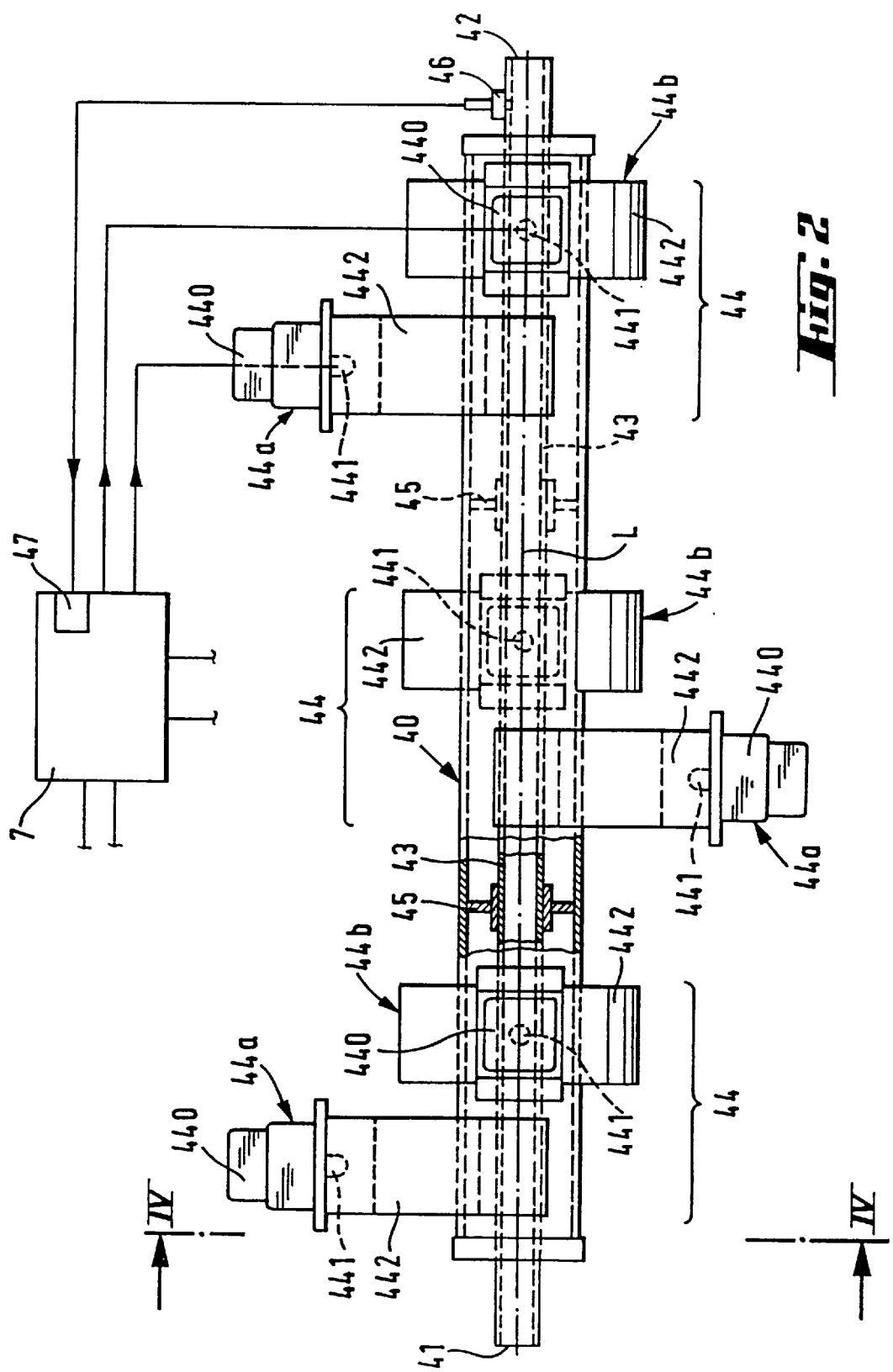
FIG. 2 is a cut-away portion of an example embodiment of an oven of the invention.

For the purpose of clarity, the oven housing has not been shown in FIG. 2. Instead, there have been shown diagrammatically only those parts of that example embodiment of the oven according to the invention that are necessary for the purposes of understanding. The Figure shows a channel 40 with an inlet 41 and an outlet 42 for the casting material. Arranged in the channel 40 is a separate pipe 43 through which the casting material flows. In order to heat the casting material by means of microwaves several heating units 44 are arranged along the channel. A heating unit 44 in this case comprises two microwave radiators 44a and 44b, which in turn each comprise a magnetron 440 as HF generator which feeds the microwave radiation by means of its antenna 441 into a waveguide 442 connected to the magnetron 440, which waveguide guides the radiation to the channel 40 and opens into that channel so that in that manner the radiation generated by the magnetron 440 is coupled into the channel 40. The waveguide 442 is so arranged that it couples the microwave radiation into the channel transversely to the direction of flow of the casting material to be heated. The antenna 441 feeds the radiation with symmetrical output into the two "branches" of the annular waveguide 442. The homogeneity of the energy coupled into the casting material is thereby increased and with it the homogeneity of the temperature of the casting material. The substantially annular waveguide 442 has a rectangular cross-section in the example embodiment described here. A waveguide 442 having a differently shaped cross-section is, however, equally possible. The important factor is to ensure the excitation of electromagnetic fields that have a stable wave shape. The dimensions of the waveguide 442 and the frequency (or the wavelength) of the microwave radiation generated by the magnetron 440 are tuned to one another. The pipe 43 preferably consists of a very low loss material for the microwave radiation, that is, a material that has only minimal dielectric losses with respect to the microwave radiation used. A suitable material for such a pipe is, for example, Teflon. The channel 40, on the other hand, consists of a material that reflects the microwave radiation, that is, a material of good conductivity, for example aluminium, so that the microwave radiation coupled into the channel can be propagated in the channel 40. As a result of the interaction between the microwave radiation and the casting material, the energy of the microwave radiation is for the most part converted into thermal energy, which ultimately results in the casting material which flows through being heated.

Figure 4:
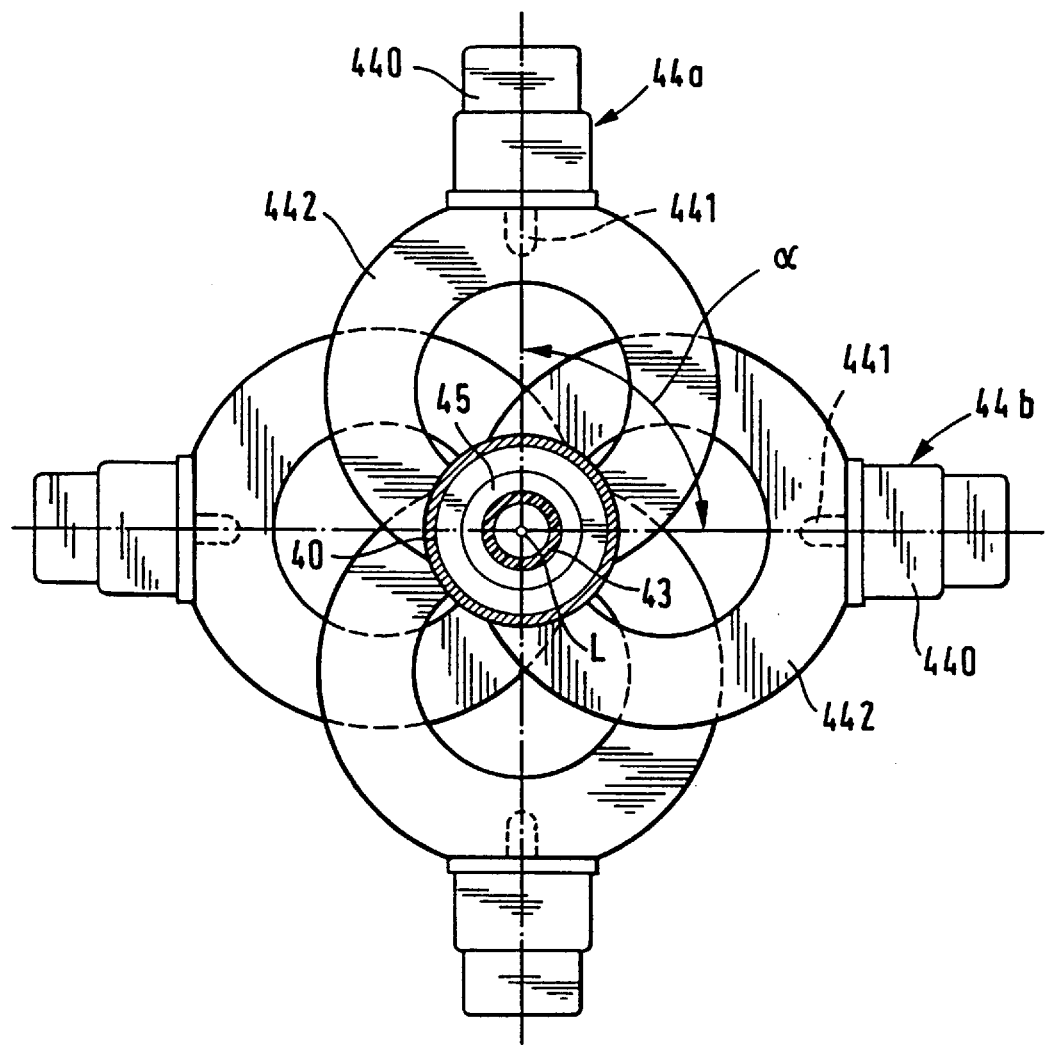
FIG. 4 is a view along the line IV—IV in FIG. 2.

As can be seen from FIG. 2, several such heating units are arranged along the channel 40, the units being arranged in such a manner that adjacent microwave radiators are essentially decoupled from one another. In the example embodiment described here, the waveguides of adjacent radiators are so arranged along the channel 40 that they open into the channel each offset at the circumference of the channel by an angle α of approximately 90°. That arrangement can be seen especially well in FIG. 4, which shows a view along the line IV—IV of FIG. 2. Generally, the angle α is so selected that the wave types excited by each radiator are propagated in the channel 40 with as different as possible a polarisation for each radiator. An especially effective decoupling of adjacent heating units 44 is produced with an angle α of approximately 90°. A good decoupling is of importance especially with regard to favourable operating regions of the magnetron. A further improvement of the decoupling may comprise electrically phase-displaced operation of the individual magnetrons.

A further measure with a view to as effective and reliable as possible a decoupling of adjacent heating units is also shown in FIG. 2. It comprises the provision in the channel of decoupling diaphragms 45 that are arranged essentially at right angles to the direction of flow of the casting material, and between individual heating units 44 viewed in the direction of flow. Obviously, in each case a separate decoupling diaphragm 45 can be arranged between all the microwave radiators but, for simplification, a diaphragm 45 has been shown only between adjacent heating units 44 in FIG. 2. Apart from its decoupling action the decoupling diaphragm 45 also has a further advantage: it can facilitate the insertion of the pipe 43 into the channel 40, especially if it is funnel-shaped. In addition, it can support the pipe 43 inserted into the channel 40. Especially when the passage through the diaphragm 45 is funnel-shaped, the insertion of the pipe 43, which normally consists of a material that is transparent to the microwave radiation, into the channel 40 is substantially facilitated by means of the diaphragm 45. A Teflon pipe is especially suitable for the described heating process.

Figure 3:
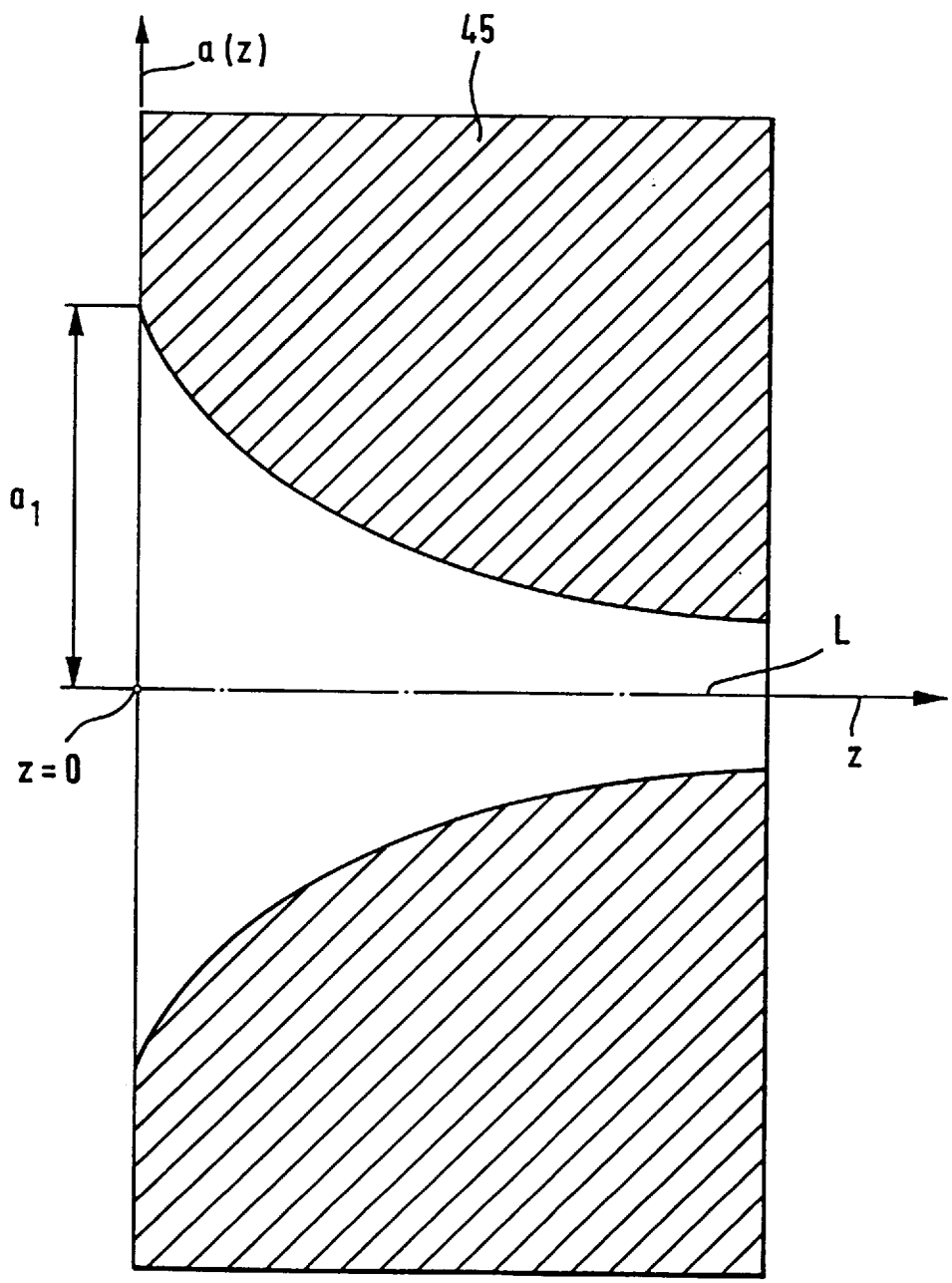
FIG. 3 shows the funnel of a variant of the decoupling diaphragm.

Decoupling by the funnel-shaped diaphragm 45 is effected by coupling the forward wave with the return wave in such a manner that a large degree of attenuation occurs. The diaphragm 45 leading in the form of a funnel towards its passsage for the pipe 43 is so designed that the generatrix of the funnel in the longitudinal direction complies with an exponential function having a negative exponent, as shown in FIG. 3. In particular, the generatrix of the funnel of the diaphragm 45 in the longitudinal direction complies with the function $$a(z) = a_1 \times \exp(-(3.13 \times 10^{-4} \times \phi k \times z \times (1 - f_c/f)^2)$$

in which z denotes the coordinate on the longitudinal axis L, the point z=0 on the longitudinal axis L coinciding with the beginning of the funnel of the diaphragm. Also, a(z) denotes the distance of the respective point of the generatrix of the funnel from the longitudinal axis L, $a_1$ denotes the distance from the longitudinal axis at the beginning of the funnel, i.e. when z=0, k denotes the wave number, φ is the attenuation in dB of the return component of the wave compared with the forward component, $f_c$ denotes the mininimum possible frequency, i.e. the lower limiting frequency, and f denotes the actual frequency of the wave. With such diaphragms it is possible, even in the case of small diaphragm lengths in the direction of the longitudinal axis L, nevertheless to achieve a good attenuation effect of the incident wave in small lengths (diaphragm length in the direction of the longitudinal axis L≦20 mm).

In FIG. 2 there is provided in the vicinity of the outlet 42 a thermoelement 46 which measures the temperature of the heated casting material. That thermoelement 46 is connected to a rapid regulating means 47 in the control means 7, which acts on the magnetrons 440, there being shown in FIG. 2 only two connections to the magnetrons 440 to represent the connections to all magnetrons. When the temperature of the heated casting material at the outlet 42 is too high, the energy generated by the magnetrons is reduced, since the pipe 43 may become blocked if the casting material reacts in the pipe 43. The possibility exists of taking measurements of the temperature distribution along the channel 40 so as to be able to establish especially desired output profiles or temperature profiles by means of optimised regulation.

Figure 5:
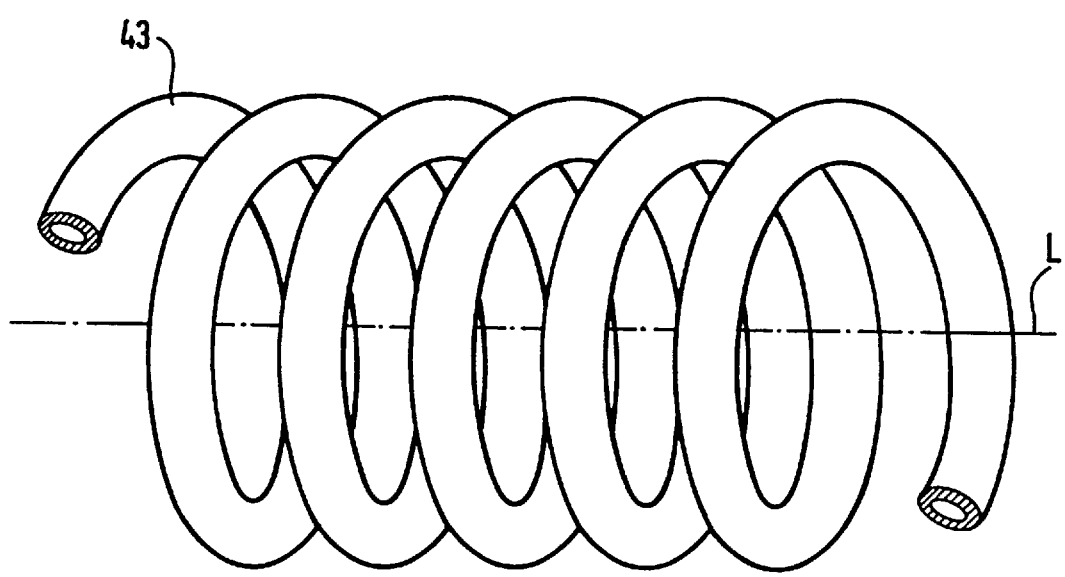
FIG. 5 shows a variant of a helical course of a pipe through which the casting material flows in the oven.

In order to improve interaction between the casting material and the electromagnetic field and thus to achieve a higher efficiency of the oven, the path along which the casting material is transported may extend in the shape of a helix about the longitudinal axis L. For that purpose the pipe 43 may be designed in the form of a helix about the longitudinal axis L as indicated in FIG. 5.

In a practical example embodiment, there may be used as casting material a mixture of hexahydrophthalic acid diglycidyl ester, hexahydrophthalic acid anhydride, benzyldimethylamine and a silanised quartz powder, in a ratio of approximately 100 parts by weight of hexahydrophthalic acid diglycidyl ester: approximately 90 parts by weight of hexahydrophthalic acid anhydride: approximately 0.5 parts by weight of benzyldimethylamine approximately 285 parts by weight of silanised quartz powder. The temperature in the supply tank may be approximately from 30° C. to 60° C., preferably approximately from 40° C. to 50° C. During the preheating operation in the microwave oven the material can then be heated to approximately from 90° C. to 110° C., preferably to approximately from 95° C. to 100° C. The temperature of the casting mould 5 may then be approximately from 130° C. to 150° C., preferably approximately from 140° C. to 145° C. The flow rate in that case may be approximately from 4.5 to 5 kg/min with a difference in the temperature of the casting material at the inlet and outlet of the oven of 60° C. Obviously, with the same oven (same microwave output), greater temperature differences can be achieved with a lower rate of flow, and smaller temperature differences with a higher rate of flow. In general, higher flow rates with a constant or greater temperature difference $\Delta T$ can be achieved by using more powerful HF generators and/or by a cascade-like connection of several ovens in series with one another. The series connection of the ovens is rendered possible by their modular construction. As shown in FIG. 2, six microwave radiators may be provided which each emit an output of 1.26 kilowatts, the frequency preferably lying in the range of approximately from 900 MHz to 30 GHz, especially approximately 2.45 GHz±10 MHz. It is, however, also possible for other frequencies to be used, the geometric dimensions of the oven and the frequencies employed being tuned to one another in each frequency range. Using such a mixture at the temperatures mentioned, it is possible to produce bubble- and crack-free castings reliably and quickly.

A further example embodiment of the channel and a few further details of an oven according to the invention are explained in the following with reference to FIGS. 6 to 11. The oven comprises a channel 140 that has an inlet for several pipes, in this case a forward pipe 141 and a return pipe 142 (FIG. 7), through which the casting material to be heated flows, as well as an outlet for those pipes. The pipes 141 and 142 are arranged at a particular distance from the longitudinal axis of the channel which is determined in the manner explained hereinafter. The casting material flows through the channel 140 first of all through the forward pipe 141. A U-shaped deflection (not shown) of the casting material heated on the forward path through the channel 140 may be effected at the outlet, and the casting material then flows back through the channel 140 again, through the return pipe 142. In that manner the radiation coupled into the channel is used twice. This simplifies the control or regulation of the output of the magnetrons. If the temperature of the resin is measured at the outlet of the return pipe 142 and it is established that it is too high or too low, the output of the magnetrons has to be regulated by a smaller amount than would be necessary if they were to be used only once, thus rendering possible more rapid regulation of the output. In addition, the homogeneity of the temperature distribution in the casting material is thereby increased.

The channel 140 itself comprises several, in this case three, individual adjacent heating units 143, 144 and 145, which are joined (e.g. welded) to one another, there being provided at each of the joining points, between the individual heating units 143, 144, 145, (and also at the inlet and at the outlet), a metallic closing wall 146. A resonance chamber for the wave is thereby defined in each case. The pipes 141 and 142 are guided through corresponding funnel-shaped openings 1461 and 1462 (FIG. 9 and FIG. 10) in the closing wall 146 (in a similar manner to that in the example embodiment described further above). As a result of the funnel-shaped construction of those openings in the closing wall 146, insertion of the pipes is facilitated during installation and the pipes are also supported thereby.

Each individual heating unit, for example the heating unit 143, comprises a microwave radiator 147 with a magnetron as generator and a, for example, rectangular waveguide 1471 (FIG. 8) connected thereto into which the microwave radiation of the magnetron is fed by means of an antenna 1472. The same applies to the heating units 144 and 145. The waveguide 1471 guides to the channel 140 the radiation which has been coupled into it from the magnetron. Since the waveguide opens into the channel 140 (FIG. 8), it couples the radiation into the channel, that opening and coupling occurring transversely to the direction of flow of the casting material to be heated.

There is provided in the waveguide 1471 a so-called tuning screw 1473. That tuning screw represents an open circuit for the forward wave in the waveguide 1471 and a short circuit for the return wave in the waveguide 1471 returning in the direction of the generator (magnetron). In that manner the generator is protected against reflections that derive, for example, from temperature-dependent variations in the material properties of the casting material. The generator can thus be operated in a stable manner in a favourable and reliable operating region (output and oscillation stability).

The tuning screw 1473 is displaceable in a slot 1474 (FIG. 7) so that when there are different high-frequency ratios in the transition plane between the waveguide 1471 and the channel 140 it is possible to effect optimal adaptation of the output. It can also be displaced in the direction into and out of the waveguide 1471 (FIG. 8) and can consequently always be optimally adjusted for different frequencies.

Worthy of special note is the length l and the diameter $d_i$ of the, for example, hollow cylindrical portion of the heating unit (FIG. 8) that forms a portion of the channel 140. The length l is smaller than half the wavelength of the microwave radiation used for the heating. This is worthy of note insofar as, with a particular spacing between two closing walls 146 and with a particular diameter $d_i$ of the portion of the heating unit which forms a portion of the channel 140, only the wave types most favourable for the proposed heating process can be propagated between the closing walls 146. Those may be, for example, waves of the type $TM_{11n}$. The two pipes 141 and 142 (FIG. 9) are so arranged that their longitudinal axes extend at a certain distance b from one another, so that the electrical field components of the waves then have a maximum on the longitudinal axis of the two pipes, which results in a very good transfer of energy to the casting material flowing in the pipes 141 and 142. The efficiency, i.e. the ratio of the thermal energy produced in the casting material to the electrical energy fed into the magnetron, may in that case be up to 70%.

The internal diameter $d_i$ of the channel portion is so selected that it is approximately $$d_i = n \times \lambda_g / 1.236,$$

n denoting a natural number (1,2,3, . . . ) and $\lambda_g$ the wavelength of the radiation in the waveguide 1471. The channel portion 140 furthermore has a length l selected roughly in the region of $$l = d_i/2$$

it being possible for that length l to vary about that value $d_i/2$ by a constant A which depends on the frequency of the radiation and on the casting material flowing through the pipe. The constant A is inversely proportional to the frequency used and to the dielectric constant $\in_0 \times \in_r$ of the casting material, thus $$A \sim l/(\in_0 \times \in_r \times f).$$

The selection of the length l of the channel portion 140 is such that the electrical field component of the wave has a minimum at the passage through the closing wall. In principle it is possible to do without separate decoupling measures, but even so the closing walls 146 naturally have to be provided between the individual units in order to define the resonance chamber for the wave propagating therein. The closing wall 146 does not, however, need to have a funnel with an exponential curve.

The distance b between the longitudinal axes of the two pipes 141 and 142 is expediently selected as a function of the size of the diameter $d_r$ (FIG. 7) of the pipes 141 and 142. For pipe diameters $d_r$ in the range $d_i/4 \leq d_r < d_i/2$, the distance b between the longitudinal axes of the pipes may be $$b \approx d_i/2$$

and, for pipe diameters $d_r$ in the range $d_r < d_i/4$, the distance b between the longitudinal axes of the pipes may be $$b \approx d_i/2 + c \times d_r,$$

the factor c, depending on the size of the pipe diameter $d_r$, lying in the range $0.5 \leq c \leq 1.2$.

In that case, too, it is in principle possible to use pipes that extend in the shape of a helix around the respective longitudinal axis, so as to lengthen the path over which the casting material is heated in the oven. Care must then, of course, be taken to ensure a corresponding distribution of the maxima of the electrical field component of the wave in the resonance chamber.

It should also be noted that the axes of adjacent waveguides in the example embodiment discussed here include an angle of $\beta=45°$ (FIG. 7), that angle, however, being completely arbitrary and being determined, simply for constructional reasons, such that adjacent magnetrons and the waveguides connected thereto do not obstruct one another spatially and can be arranged in a space-saving manner. The choice of the angle $\beta$ between the axes of adjacent waveguides has nothing, however, to do with the decoupling of adjacent magnetrons.

Finally, FIG. 11 shows a further example embodiment of the channel and a few further details of the oven according to the invention. It is possible to see here that two modules, as shown in FIG. 6, which each comprise three individual heating units, are assembled in modular fashion to form a channel having six heating units. That is of advantage especially if larger amounts of a casting material have to be heated within a short period, and consequently more energy in the form of microwave radiation has to be supplied, since also a larger amount of casting material has to be heated. The modular construction is very advantageous since the individual modules are simple to assemble and consequently it is possible for ovens of even greater output also to be constructed using the same modules simply by connecting several individual modules one after another.

What is claimed is:

1. An oven for heating an essentially liquid medium flowing through the oven, having an inlet into a channel located in said oven for the medium to be heated, in which channel there is arranged a separate pipe through which the medium to be heated flows and in which it is heated by means of electromagnetic radiation, wherein along the channel several heating units are arranged, each heating unit comprises an electromagnetic radiator containing a waveguide which guides the radiation to the channel through which the medium flows and which couples the radiation into that channel, wherein the heating units are substantially decoupled from one another by means of a decoupling diaphragm which is provided in the channel and which is arranged between two adjacent heating units or radiators essentially at right angles to the direction of flow, the pipe through which the medium flows passes through a passage in the decoupling diaphragm, the diaphragm thus also constituting a support for said pipe.

2. An oven according to claim 1, wherein the waveguides of said electromagnetic radiator are so arranged along the channel that said waveguides couple the radiation into the channel transversely to the direction of flow of the medium to be heated.

3. An oven according to claim 1, wherein the radiators comprise a magnetron and a hollow guide connected thereto as a waveguide which opens into the channel, guides the radiation generated by the magnetron to the channel and couples it into the channel.

4. An oven according to claim 1, wherein the pipe consists of a material that is loss-free or low loss for a selected operational wavelength of radiation.

5. An oven according to claim 1, wherein the diaphragm is designed to lead in the form of a funnel towards its passage for the pipe, the generatrix of the funnel in the longitudinal direction viewed in the plane of longitudinal section complying with an exponential function having a negative exponent.

6. An oven according to claim 5, wherein the exponential function with which the generatrix of the funnel of the diaphragm in the longitudinal direction complies is described by $$a(z)=a_1 \times \exp-(3.13 \times 10^{-\phi} \times k \times z \times (1-f_c/f)^2)$$

wherein z denotes the coordinate on the longitudinal axis (L), a(z) denotes the distance of the respective point of the generatrix of the funnel from the longitudinal axis, $a_1$ denotes the distance from the longitudinal axis (L) at the beginning of the funnel, k denotes the wave number, $\phi$ is the attenuation in dB of the return component of the wave compared with the forward component, $f_c$ denotes the minimum possible frequency, that is the lower limiting frequency, and f denotes the actual frequency of the wave.

7. An oven according to claim 1, wherein the waveguides of adjacent radiators are so arranged along the channel that said waveguides open into the channel each offset at the circumference of the channel by an angle ($\alpha$).

8. An oven according to claim 7 wherein the angle ($\alpha$) is approximately 90°.

9. An oven according to claim 1, wherein the medium to be heated is repeatedly passed through the oven and exposed to the electromagnetic radiation.

10. An oven according to claim 9, wherein a forward pipe and a return pipe are provided in the channel, the medium to be heated flowing first through the forward pipe and then through the return pipe, and the longitudinal axes of the two pipes being arranged at a distance from the longitudinal axis of the channel that is so selected that the electrical field component of the radiation has a maximum on the longitudinal axis of the two pipes.

11. An oven according to claim 1, wherein the oven is of modular design and each individual module comprises an electromagnetic radiator having a waveguide which opens into a channel portion bounded at each end by closing walls and thus defining a resonance chamber into which the electromagnetic radiation is coupled and through which there is guided by means of passages in the closing walls the pipe through which the medium to be heated is guided.

12. An oven according to claim 11, wherein the channel portion is in the form of a hollow cylinder and has an internal diameter $d_i$ that is so selected that it is approximately $$d_i = n \times \lambda_g / 1.236,$$

n denoting positive integer and $\lambda_g$ the wavelength of the radiation in the waveguide, and wherein furthermore the channel portion has a length (l) that is smaller than half the wavelength and is selected approximately in the region of $$l \approx d_i/2,$$

it being possible for said length (l) to vary by a constant which depends on the frequency of the radiation and on the medium flowing through the pipe, and the selection of the length (l) of the channel portion is such that the electrical field component of the radiation has a minimum at the passage through the closing wall.

13. An oven according to claim 10, wherein the distance (b) between the longitudinal axes of the forward pipe and the return pipe is approximately $$b \approx d_i/2$$

for pipe diameters ($d_r$) in the range $d_i/4 \leq d_r < d_i/2$, and the distance (b) between the longitudinal axes of the forward pipe and the return pipe is $$b \approx d_i/2 + c \times d_r$$

for pipe diameters $d_r$ in the range $d_r < d_i/4$, the factor c lying in the range $0.5 \leq c \leq 1.2$.

14. An oven according to claim 1, wherein the medium to be heated is guided through the oven along a helical line.

15. An oven according to claim 1, wherein there is provided in the waveguide a displaceable tuning screw which can be so displaced that it represents an open circuit for the radiation going towards the channel and a short circuit for the radiation returning from the channel.

16. A plant for the manufacture of solid castings from an essentially liquid reactive medium as casting material which, on reaching its gelation temperature, reacts to form a solid material, with a supply tank for providing the medium, in which the temperature of the casting material lies substantially below the gelation temperature of the casting material, and with a feeding means for feeding the casting material into a casting mold which has been heated to a temperature that lies above the gelation temperature of the casting material, wherein an oven according to claim 20 is connected directly upstream of the casting mold.

17. A plant according to claim 16, wherein there is provided between the supply tank and the oven a separate pressure vessel from which the casting material is taken and fed through the oven to the casting mold.

18. A plant according to claim 17, wherein the pressure vessel is arranged on scales which, when an adjustable amount of casting material has been taken from the pressure vessel, sends a signal to a control means which, on the basis of that signal, increases the pressure under which the casting material is conveyed from the pressure vessel to the casting mold.

19. An oven for heating a reactive casting material flowing through the oven, having an inlet into a channel located in said oven for the medium to be heated, in which channel there is arranged a separate pipe through which the medium to be heated flows and in which it is heated by means of electromagnetic radiation, wherein along the channel several heating units are arranged, each heating unit comprises an electromagnetic radiator containing a waveguide which guides the radiation to the channel through which the medium flows and which couples the radiation into that channel, wherein the heating units are substantially decoupled from one another by means of a decoupling diaphragm which is provided in the channel and which is arranged between two adjacent heating units or radiators essentially at right angles to the direction of flow, the pipe through which the medium flows passes through a passage in the decoupling diaphragm, the diaphragm thus also constituting a support for said pipe.

20. An oven according to claim 19, wherein the waveguides of said electromagnetic radiator are so arranged along the channel that said waveguides couple the radiation into the channel transversely to the direction of flow of the medium to be heated.

21. An oven according to claim 19, wherein the radiators comprise a magnetron and a hollow guide connected thereto as a waveguide which opens into the channel, guides the radiation generated by the magnetron to the channel and couples it into the channel.

22. An oven according to claim 19, wherein the pipe consists of a material that is loss-free or low loss for a selected operational wavelength of radiation.

23. An oven according to claim 19, wherein the diaphragm is designed to lead in the form of a funnel towards its passage for the pipe, the generatrix of the funnel in the longitudinal direction viewed in the plane of longitudinal section complying with an exponential function having a negative exponent.

24. An oven according to claim 23, wherein the exponential function with which the generatrix of the funnel of the diaphragm in the longitudinal direction complies is described by $$a(z) = a_1 \times \exp{-(3.13 \times 10^{-\phi} \times k \times z \times (1 - f_c/f)^2)}$$

wherein z denotes the coordinate on the longitudinal axis (L), a(z) denotes the distance of the respective point of the generatrix of the funnel from the longitudinal axis, $a_1$ denotes the distance from the longitudinal axis (L) at the beginning of the funnel, k denotes the wave number, $\phi$ is the attenuation in dB of the return component of the wave compared with the forward component, $f_c$ denotes the minimum possible frequency, that is the lower limiting frequency, and f denotes the actual frequency of the wave.

25. An oven according to claim 19, wherein the waveguides of adjacent radiators are so arranged along the channel that said waveguides open into the channel each offset at the circumference of the channel by an angle ($\alpha$).

26. An oven according to claim 25 wherein the angle ($\alpha$) is approximately 90°.

27. An oven according to claim 19, wherein the medium to be heated is repeatedly passed through the oven and exposed to the electromagnetic radiation.

28. An oven according to claim 27, wherein a forward pipe and a return pipe are provided in the channel, the medium to be heated flowing first through the forward pipe and then through the return pipe, and the longitudinal axes of the two pipes being arranged at a distance from the longitudinal axis of the channel that is so selected that the electrical field component of the radiation has a maximum on the longitudinal axis of the two pipes.

29. An oven according to claim 19, wherein the oven is of modular design and each individual module comprises an electromagnetic radiator having a waveguide which opens into a channel portion bounded at each end by closing walls and thus defining a resonance chamber into which the electromagnetic radiation is coupled and through which there is guided by means of passages in the closing walls the pipe through which the medium to be heated is guided.

30. An oven according to claim 29, wherein the channel portion is in the form of a hollow cylinder and has an internal diameter $d_i$ that is so selected that it is approximately $$d_i = n \times \lambda_g / 1.236,$$

n denoting positive integer and $\lambda_g$ the wavelength of the radiation in the waveguide, and wherein furthermore the channel portion has a length (l) that is smaller than half the wavelength and is selected approximately in the region of $$l \approx d_i/2,$$

it being possible for said length (l) to vary by a constant which depends on the frequency of the radiation and on the medium flowing through the pipe, and the selection of the length (l) of the channel portion is such that the electrical field component of the radiation has a minimum at the passage through the closing wall.

31. An oven according to claim 28, wherein the distance (b) between the longitudinal axes of the forward pipe and the return pipe is approximately $$b \approx d_i/2$$

for pipe diameters ($d_r$) in the range $d_i/4 \leq d_r < d_i/2$, and the distance (b) between the longitudinal axes of the forward pipe and the return pipe is $$b \approx d_i/2 + c \times d_r$$

for pipe diameters $d_r$ in the range $d_r < d_i/4$, the factor c lying in the range $0.5 \leq c \leq 1.2$.

32. An oven according to claim 19, wherein the medium to be heated is guided through the oven along a helical line.

33. An oven according to claim 19, wherein there is provided in the waveguide a displaceable tuning screw which can be so displaced that it represents an open circuit for the radiation going towards the channel and a short circuit for the radiation returning from the channel.

* * * * *